Sept. 28, 1965 A. G. FISK 3,208,432
EXAMINATION AND TREATMENT TABLE FOR VETERINARY USE
Filed Jan. 11, 1963 3 Sheets-Sheet 1
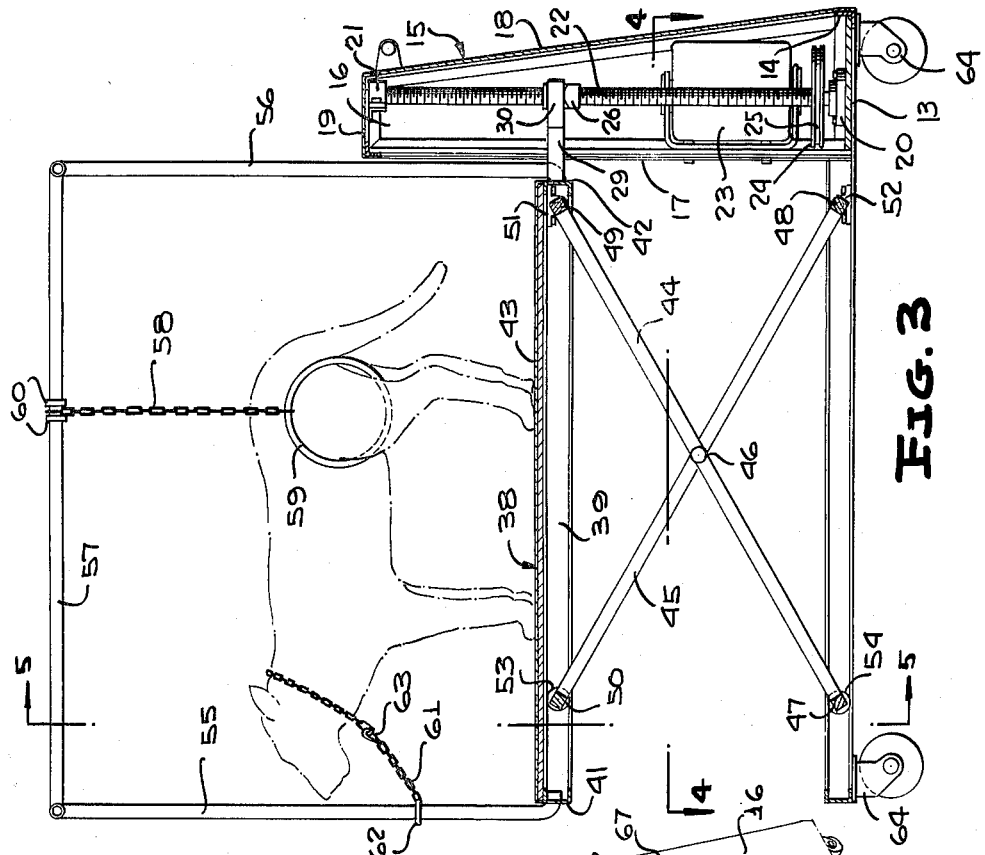
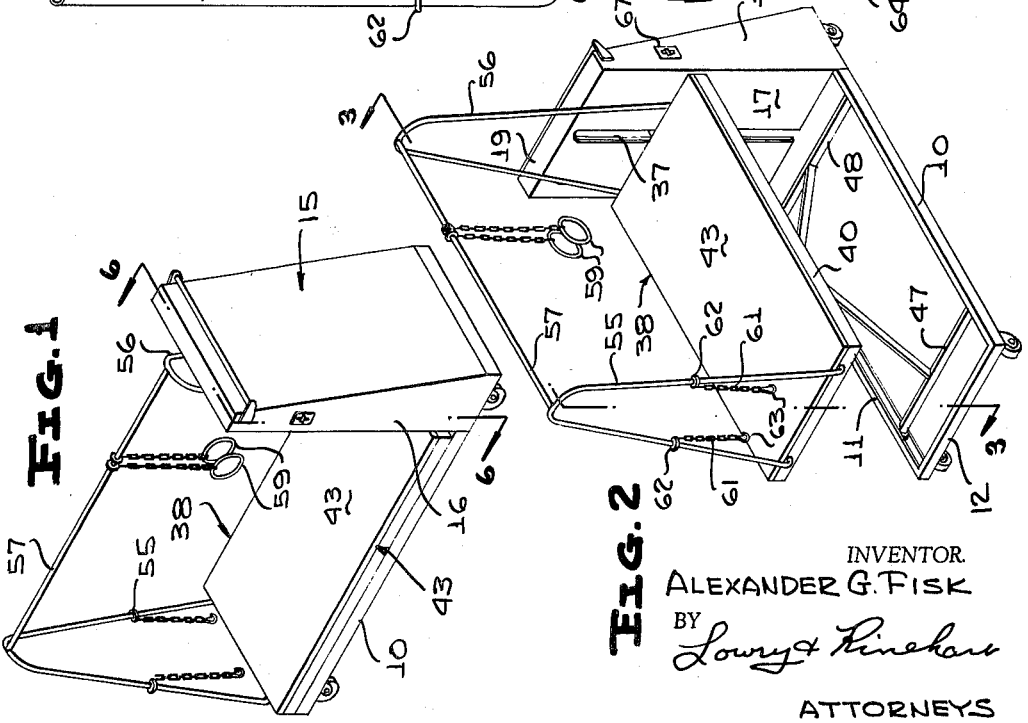
INVENTOR.
ALEXANDER G. FISK
BY
Lowry & Rinehart
ATTORNEYS Sept. 28, 1965  A. G. FISK  3,208,432
EXAMINATION AND TREATMENT TABLE FOR VETERINARY USE
Filed Jan. 11, 1963  3 Sheets-Sheet 2
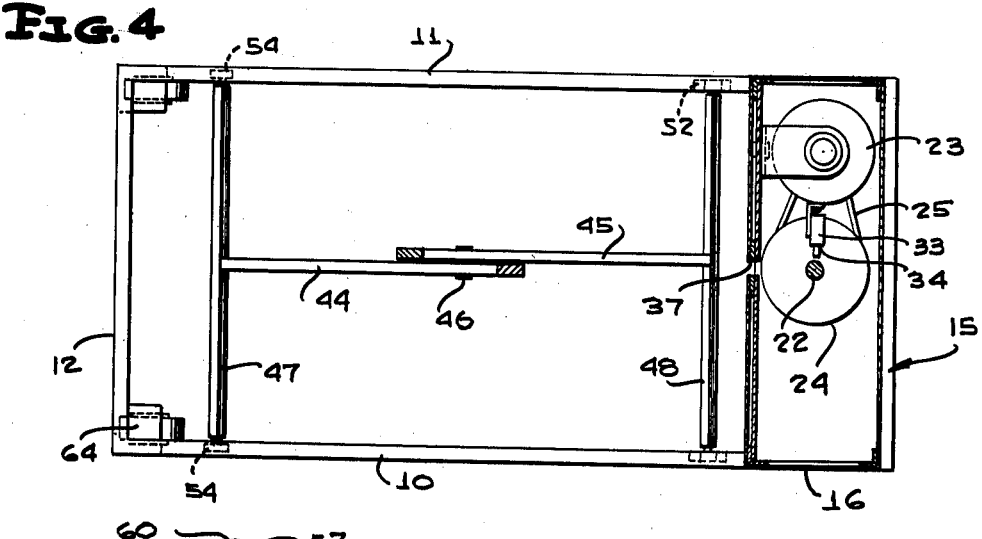
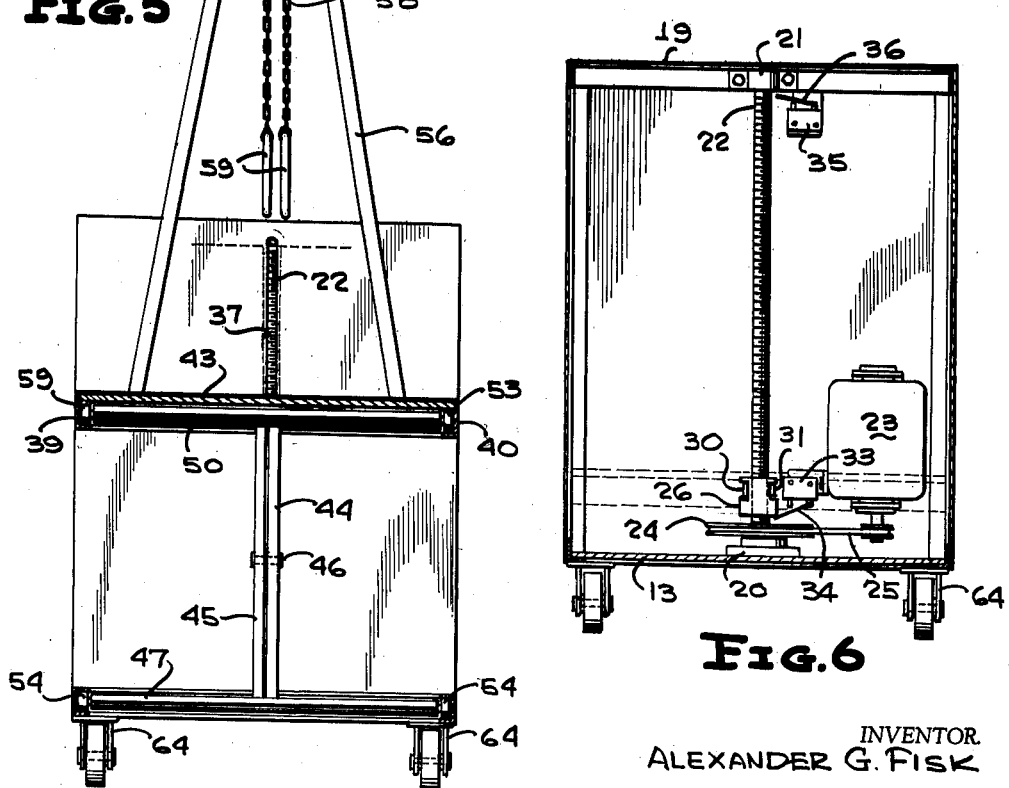
INVENTOR.
ALEXANDER G. FISK
BY *Lowry & Rinehart*
ATTORNEYS

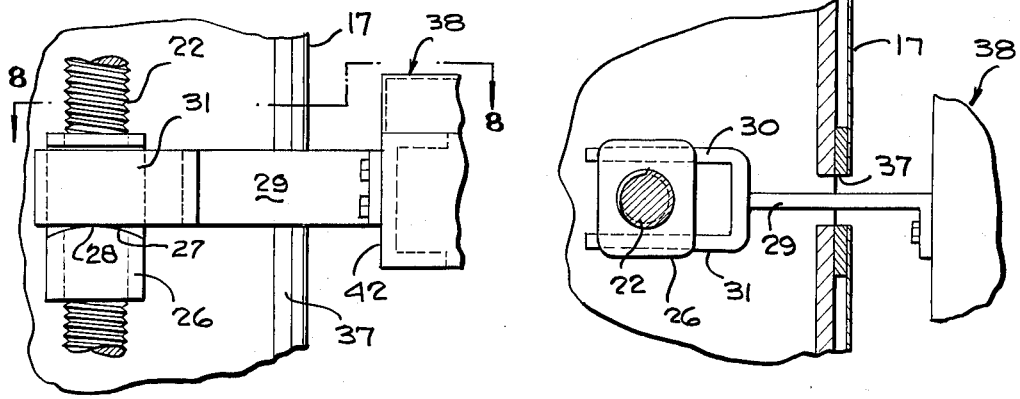
Fig. 7
Fig. 8
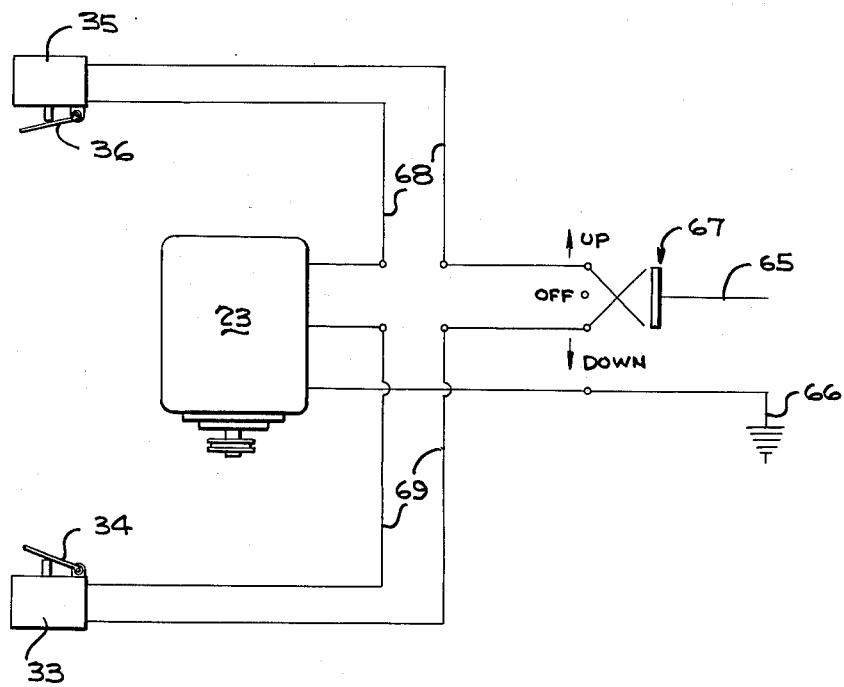
Fig. 9

United States Patent Office

3,208,432
Patented Sept. 28, 1965

3,208,432
EXAMINATION AND TREATMENT TABLE FOR VETERINARY USE
Alexander G. Fisk, 730 Hawthorn Ave., Boulder, Colo., by order for distribution, to Dot A. Fisk, widow of said Alexander G. Fisk, deceased
Filed Jan. 11, 1963, Ser. No. 250,830
8 Claims. (Cl. 119—103)

This application relates to an examination and treatment table particularly useful to veterinarians in the handling and treatment of dogs and other small animals.

Statistics now available show that family pets, show dogs, hunting dogs, cats and other small animals are being given greatly increased veterinary care. The techniques and methods of modern medical science are being applied to animal injuries and diseases, and the veterinary establishment has become an integral part of every community. In many cases, treatment equipment has not kept pace with the increased activity, and many veterinarians have carried out a lage volume of daily practice using antiquated methods and inadequate apparatus.

One necessity to veterinary practice has been the use of a table upon which the animals are placed so that they will be at the proper height for examination and diagnosis, and treatment of minor conditions. Usually the animal has been lifted onto the table. With the smaller animals, weighing fifteen pounds or less, there has not been any great difficulty or danger, but in the case of the larger animals, there has been considerable danger and difficulty to the operator and very often complication of symptoms. For example, a large dog injured by a car may have broken bones, and it is evident that harm might be done in a struggle to get a heavy, unwilling animal up on a relatively high table. Very often, the veterinarian receives face bites and scratches, and almost invariably the animal is excited, frightened or angered. The result is an accelerated pulse and respiration which immeasurably confuses a preliminary diagnosis.

In order to obtain the best results in the majority of examination and treatment room procedures, the animal patient should be in a standing position on the examination and treatment table, and the fewer persons in the room besides the veterinarian, the better the procedure is accomplished. When the animal is on the table, therefore, it is advantageous to have some means of restraint of the animal other than physical restraint by the owner or the assistant.

A further disadvantage of the presently known treatment table is that the table is of a fixed height, and this does not provide for the very large variety in sizes of animals under treatment. A very large dog, for example, may be positioned far too high for proper treatment or examination of the upper body areas and portions.

It is an object of the present invention, therefore, to overcome many of the above mentioned difficulties and provide a basic unit for use in veterinary establishments which has great versatility and maximum ease of operation.

It is an object of the present invention to provide a treatment and examination table whereby the animal may step onto the table at a level very close to the ground, or may be gently lifted onto the table through a very short distance with a minimum of difficulty.

Still another object of the invention is to provide an examination and treatment table which is easily capable of use by one person, there being provided switch operated power means for raising the table when the animal has been quietly persuaded thereon and then for lowering the table when the examination is completed.

A further object of the invention is to provide power lift means wherein the table is kept level at all times and which is simple and quiet in operation, requiring a minimum of maintenance and repair.

Still another object of the invention is to provide a treatment and examination table which is fitted with caster wheels so that it may be moved to different positions in the laboratory with ease and without alarming the animal patient.

Still another object of the invention is to provide a restraining means for the animal which adequately holds the animal without the aid of an assistant, which holds the animal in a standing position, as preferred, for purposes of the examination, and which is easily adjustable to animals of widely varying size.

Another object of the invention is to provide a table wherein the table may be raised and lowered to any desired height by operating suitable switch means and which is further provided with limit switches to automatically stop the table as it reaches maximum upper or lower position.

A final object of the invention is to provide an examination and treatment table which may be easily kept clean and sterile and wherein the power operating equipment is completely housed for sanitary purposes.

With the above and other objects in view, as will be presenty apparent, the invention consists in general of certain novel details of construction and combinations of parts hereinafter fully described, illustrated in the accompanying drawings, and particularly claimed.

In the drawings, like reference numerals indicate like parts in the several views, and FIGURE 1 is an isometric view of the examination and treatment table, showing the movable top at its lowermost position for placing the animal patient thereon;

FIGURE 2 is an isometric view of the examination and treatment table, showing the movable top in raised position;

FIGURE 3 is a longitudinal sectional view taken on the line 3—3 of FIGURE 2 and showing the manner in which the animal is restrained for examination and treatment;

FIGURE 4 is a cross-sectional view taken on the line 4—4 of FIGURE 3;

FIGURE 5 is a transverse sectional view taken on the line 5—5 of FIGURE 3;

FIGURE 6 is a cross-sectional view taken on the line 6—6 of FIGURE 1, showing details of the drive mechanism and limit switches;

FIGURE 7 is a fragmentary view showing the detail of the drive connection between the drive screw and the movable table top;

FIGURE 8 is a fragmentary sectional view taken on the line 8—8 of FIGURE 7; and

FIGURE 9 is a schematic diagram of a typical control circuit.

In the drawings, the reference numerals 10 and 11 indicate the side rails of the base frame of the table. These rails are channel shaped with the channels directed inwardly for a purpose hereinafter more fully described. The side rails 10 and 11 are joined at one end by the end rail 12 and at the other end by a plate 13 and an angle iron 14. Suitable framing members are provided for a drive housing 15. The housing is closed by end plates 16, a back plate 17, a front plate 18, and a top plate 19. The front plate 18 is preferably secured with removable screws so that access may be had to the drive mechanism. A thrust bearing 20 is suitably fastened to the plate 13, and a pillow block 21 is positioned just below the top plate 19. The pillow block and thrust bearing have journalled therein for rotation a vertically disposed screw shaft 22. The lower end of the shaft 22 has fixed thereto the drive pulley 24, and this is preferably rather large in diameter. A motor 23 is mounted within the drive housing 15 and drives the pulley 24 by means of the belt 25. A power lift nut 26 is threadedly engaged with the screw shaft 22, and the detail of this nut is best shown in FIGURE 7. This nut is provided with notches having curved lower surfaces 27 defining fulcrums 28. In engagement with the fulcrums 28 of the power lift nut 26 is a power lift arm 29. The free end of the power lift arm is U-shaped with the legs of the U, designated by the reference numerals 30 and 31, extending on opposite sides of the threaded screw shaft 22. The lower edges of the legs 30 and 31 engage the fulcrums 28. The arrangement just described provides a non-rigid drive connection between the screw shaft 22 and the lift table of the invention, which permits adjustments for inaccuracies in the structure and prevents binding as the table is raised and lowered. A lower limit switch 33 is mounted within the housing 15 at a point wherein its arm 34 is engaged by the power lift nut 26 when the lift table, shortly to be described in greater detail, reaches its lower limit of travel. An upper limit switch 35 is mounted within the drive housing 15 at a point wherein its switch arm 36 will be engaged by the power lift nut 26 when the lower lift nut reaches its upper limit of travel on the screw shaft 22. This will likewise be the upper limit of travel for the power lift table. The lower lift arm 29 extends outwardly through an elongated slot 37 which is formed in the back plate 17. The outer end of the lower lift arm 29 is attached to a power lift table 38.

The power lift table is formed of side channel members 39 and 40, with the channels turned inwardly. These are connected by end channels 41 and 42. To the frame so formed is fastened a table plate 43 which may be formed of plyboard covered with stainless steel sheet.

The leveling and supporting mechanism for the power lift table comprises a pair of crossed legs 44 and 45. These are pivotally connected by a pin 46. At the ends of each of the crossed legs 44 and 45 are secured the transverse bars 47, 48, 49 and 50. The transverse bars 48 and 49 are pivotally supported on upper pillow blocks 51 and lower pillow blocks 52. The ends of the transverse bars 47 and 50 are provided with freely running rollers 53 and 54. These rollers fit within the channels 10, 11, 39 and 40, and are guided by the channels as they roll therein.

The power lift table 38 is provided with two generally U-shaped arches identified by the reference numerals 55 and 56. These arches are securely fastened at their lower ends to the power lift table. Joining the arches is a connecting bar 57.

A restraining chain 58 extends over the connecting bar 57 and the ends of the chain are provided with the relatively large rings 59. The connecting bar 57 is provided with friction washers 60 of resilient material, and these washers may be slid against resistance along the connecting bar 57 to adjust the restraining device along the bar for animals of varying size.

Further restraining chains 61 are mounted on the legs of the arch 55, and these are provided with friction rings 62 which slide along the legs of the arch 55 for adjustment, but which will normally stay in adjusted position unless considerable force is applied. Snap hooks 63 at the ends of the restraining chains 61 are adapted for attachment to the chair or collar normally worn by the animal.

The base frame of the device is provided with caster wheels 64, so that the entire examination and treatment table may be moved in any direction as desired to various parts of the operating room or laboratory.

A typical switching and operating circuit for the device is shown in FIGURE 9. The motor 23 is provided with a power source including the lead 65 and the ground 66. The lead 65 is provided with a reversing switch 67 which has two on positions and a neutral or off position. Leads 68 lead from one field of the motor 23 to the upper limit switch 35. Leads 69 lead from the reversing field of the motor 23 to the lower limit switch 33. The other lead to the motor is taken to the ground 66. Both limit switches 33 and 35 are normally biased closed until the power lift nut 26 hits the arms 34 or 36, respectively, causing the switch to open. For example, if the reversing switch 67 is turned to up position, the motor will turn in a direction to lift the table 38 until the upper limit of travel is reached. At that point, the power lift nut 26 will engage the arm 36, opening the limit switch 35, and the circuit will be broken, stopping the motor 23. The motor will remain stopped until the reversing switch is turned to down position, moving the power lift table downwardly, at which time the upper limit switch 35 will again close. The table will continue in its downward direction until the power lift nut 26 engages the arm 34, at which time the switch 33 will open, shutting off the motor 23. Again, the motor will remain at rest until the switch 67 is reversed to up position. If the power lift table is between its upper and lower limits, then it may be moved upwardly or downwardly at will, by moving the reversing switch 67 to up or down position or to off. When the switch is moved to the off position, the table will stop at whatever point the power lift nut 26 occupies upon the screw shaft 22.

*Operation*

In using the table, the switch 67 is thrown to down position, and the power lift table 38 moves to its lowermost limit of travel until it is stopped by the limit switch 33.

The animal is then gently coaxed to step upon the table plate 43, or is lifted thereon, and the rings 59 are slipped about the hind legs of the animal. The chain 58 may be adjusted to the desired length, and the chain is moved along the connecting bar 57 to the desired position. The chains 61 are then snapped to the collar of the animal, and the animal is thus in a desired standing position but unable to escape from the table.

As soon as restraint is accomplished, the switch 67 is turned to up position, and the table moves upwardly to any desired height according to the size of the animal or according to the area of the body to be worked upon. The switch 67 is then turned to off position, and the table will stop at the desired point. As the examination progresses, the table may be raised or lowered, any small amount by manipulation of the switch 67.

At the end of the treatment and examination, the switch 67 is again turned to down position, and the power lift table 38 is allowed to move to its lowermost position whereby the animal is released.

It will thus be seen that the veterinarian, working alone, can easily load and restrain the animal, and then may move the table as desired to any desired height or to any desired position without the need for an assistant.

While there have been herein shown and described the preferred embodiments of the invention, it will be readily seen that minor changes may be made therein without departing from the spirit and scope of the invention as claimed.

What is claimed is:

1. An examination and treatment table for veterinary use, including a relatively low, flat generally horizontally disposed ground supported base, a vertically slotted housing at one end of said base extending vertically upwardly therefrom a distance at least greater than the maximum table height, a planar animal supporting top positioned above said base and having an adjustable raised and lowered position relative to said base from a position directly on said base to a table height position spaced therefrom while remaining substantially parallel to said base, said supporting top being freely and laterally accessible from at least three sides in all of said adjusted positions, power means including a vertically disposed traversing member concealed in said housing for raising and lowering said top to any of its said adjusted positions, and projecting means extending from said table into said housing through said slot and connecting said supporting top to said traversing member of said power means.

2. An examination and treatment table for veterinary use as set forth in claim 1, said table having a restraining frame thereabove and connected thereto, said frame including a bar extending longitudinally of said table and spaced therefrom, a restraining chains slidably connected to and supported by said bar, relatively large restraining rings connected to the free ends of said chains, said rings being adapted to be placed over the rear legs of an animal supported on said table.

3. An examination and treatment table for veterinary use as set forth in claim 1, said table having a restraining arch supported thereon, said arch comprising substantially U-shaped members adjacent the ends of said table and a connecting bar joining said U-shaped members, said bar having restraining chains supported thereby, said chains being held in adjusted position along said bar by resilient washers engaging said bar and slidable therealong to adjusted position.

4. A structure as set forth in claim 3, further including restraining chain means connected to one of said U-shaped members and being in frictional engagement therewith for sliding along said member.

5. An examination and treatment table for veterinary use, including a relatively low, flat generally horizontally disposed ground supported base, a vertically slotted housing at one end of said base extending vertically upwardly therefrom a distance at least greater than the maximum table height, a planar animal supporting top positioned above said base and having an adjustably raised and lowered position relative to said base from a position directly on said base to a table height position spaced therefrom while remaining substantially parallel to said base, said supporting top being freely and laterally accessible from at least three sides in all of said adjusted positions, power mean including a vertically disposed traversing member concealed in said housing for raising and lowering said top to any of its said adjusted positions, projecting means extending from said table into said housing through said slot and connecting said supporting top to the traversing member of said power means, and extensible stabilizing and top supporting means positioned between said base and said supporting top.

6. A structure as set forth in claim 1, wherein said power means includes manually operated switch means for reversing and starting and stopping said power means at any selected adjusted position of said animal supporting top.

7. A structure as set forth in claim 1, wherein said traversing member comprises a vertically disposed rotatable screw shaft and a nut movably mounted on said shaft, said nut being connected to said connecting means.

8. A structure as set forth in claim 1, wherein said power means includes a drive motor, an energy source for said motor having a reversing switch therein, and upper and lower limit switches cutting off said motor when said top reaches its maximum upper and lower positions.

References Cited by the Examiner

UNITED STATES PATENTS

| | | | |
|---|---|---|---|
| 239,876 | 4/81 | Stark | 108—144 |
| 1,704,045 | 3/29 | Jackson | 119—103 |
| 2,070,468 | 2/37 | Chapman | 108—145 |
| 2,184,364 | 12/39 | Shook | 119—103 |
| 2,279,012 | 4/42 | Packchanian | 119—103 |
| 2,284,531 | 5/42 | Miller et al. | 312—298 |
| 2,649,345 | 8/53 | Hubbard | 108—144 |
| 2,667,391 | 1/54 | Keal | 108—144 |
| 2,829,622 | 4/58 | Borthwick | 119—103 |
| 2,929,357 | 3/60 | Hoyme et al. | 119—103 |
| 3,023,734 | 3/62 | Schuab | 119—103 |
| 3,120,836 | 2/64 | Brauning | 119—103 |

SAMUEL KOREN, *Primary Examiner.*

ALDRICH F. MEDBERY *Examiner.*